Feb. 15, 1966 C. J. HIRSCH 3,235,806

SIGNAL TRANSLATING CIRCUIT

Filed Sept. 21, 1961

4 Sheets-Sheet 1

INVENTOR.
CHARLES J. HIRSCH
BY Eugene M. Whitacre
ATTORNEY

INVENTOR.
CHARLES J. HIRSCH
BY Eugene M. Whitacre
ATTORNEY

Feb. 15, 1966 C. J. HIRSCH 3,235,806
SIGNAL TRANSLATING CIRCUIT
Filed Sept. 21, 1961 4 Sheets-Sheet 3
FIG. 10.
CURRENT I, CONDUCTANCE $g_o$, AND CONVERSION CONDUCTANCE $g_c$, AS $f(E_b, E_o)$
| $E_o$ (V) → | 0 | 0 | 0 | 0.01 | 0.01 | 0.02 | 0.02 | 0.03 | 0.03 | 0.04 | 0.04 | 0 | 0.01 |
|---|---|---|---|---|---|---|---|---|---|---|---|---|---|
| $E_b$ (V) | I amp | $g_o$ mho | $g_c$ mho | $g_o$ | $g_c$ | $g_o$ | $g_c$ | $g_o$ | $g_c$ | $g_o$ | $g_c$ | $g_o/I$ | $g_o/I$ |
| 0 | 0.06 | 42.5 | 0 | 43.0 | -6.4 | 44.4 | -12.8 | 46.8 | -19.3 | 49.9 | -25.7 | 71.6 | |
| 0.05 | 0.90 | 0.7 | 0 | 1.1 | -2.2 | 2.1 | -4.4 | 3.7 | -6.8 | 6.1 | -9.7 | 0.8 | |
| 0.06 | 0.88 | -3.0 | 0 | -2.7 | -1.6 | -1.8 | -3.2 | -0.3 | -4.9 | 1.7 | -7.0 | -3.4 | |
| 0.08 | 0.76 | -7.1 | 0 | -6.9 | 0.6 | -6.2 | -1.2 | -5.2 | -2.0 | -3.8 | -2.9 | -9.4 | |
| 0.10 | 0.60 | -7.9 | 0 | -7.8 | 0.07 | -7.4 | 0.1 | -6.8 | 0.01 | -5.9 | -0.3 | -13.2 | -9.1 |
| 0.12 | 0.45 | -6.0 | 0 | -6.8 | 0.4 | -6.6 | 0.8 | -6.4 | 1.0 | -6.0 | 1.1 | -15.1 | -15.1 |
| 0.15 | 0.29 | -4.0 | 0 | -4.0 | 0.5 | -4.1 | 0.9 | -4.2 | 1.3 | -4.3 | 1.6 | -13.8 | -13.8 |
| 0.20 | 0.14 | -1.2 | 0 | -1.3 | 0.08 | -1.4 | 0.2 | -1.6 | 0.3 | -1.8 | 0.4 | -8.6 | -9.3 |
| 0.25 | 0.12 | -1.6 | 0 | -1.5 | -0.05 | | | | | | | -13.3 | -12.5 |
| 0.30 | 0.17 | -0.7 | 0 | -0.7 | 0.30 | | | | | | | -4.0 | |
| 0.35 | 0.20 | 3.7 | 0 | 3.8 | 0.60 | | | | | | | | |
| 0.40 | 0.27 | 9.5 | 0 | | | | | | | | | | |
| 0.45 | 1.26 | 17.7 | 0 | | | | | | | | | | |
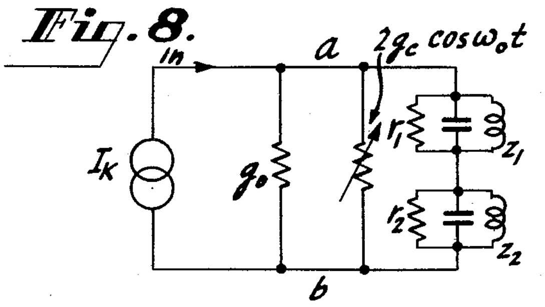
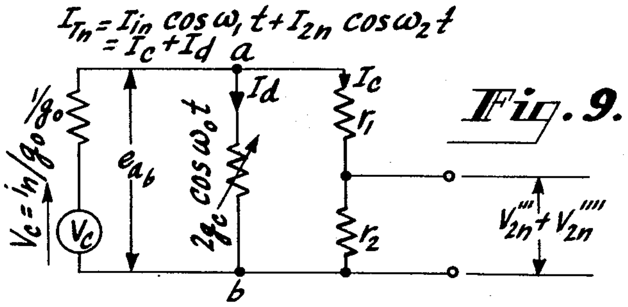
INVENTOR.
CHARLES J. HIRSCH
BY Eugene M. Whitacre
ATTORNEY

$N_F$ AND $G_P$

I-CIRCUIT PARAMETER

A) COMPLETE MISMATCH $r_g = r_1$

B) $1 + g_o r_1 = b$ $b = 0$ (COL 9)

$b = \pm 0.1$ (COL. 10)

C) $(g_c/g_o)^2 < 1$ $$\frac{r_2}{r_1} < \frac{1}{1-\left(\frac{g_c}{g_o}\right)^2}$$

$\simeq 1.0+$

II-OPERATING COND.

E) $N_F = \left[1 + 20\left|\frac{I_o}{g_o}\right|\right]\left[1 + \left|\frac{g_o}{g_c}\right|b^2\right]^2$ $b = 0$ (COL. 9

$b = \pm 0.1$ (COL. 10

F) $G_p' = 4\left(\frac{g_o}{g_c}\right)^2 \frac{r_1}{r_2}$

G) $BC = \frac{g_c^2}{g_o} \frac{r_2}{r_2 - r_1}$ (ARRANGED IN ORDER OF INCREASING VALUES OF $g_o/I_o$) (COL. 6)

| | 1 | 2 | 3 | 4 | 5 | 6 | 7 | 8 | 9 | 10 | 11 | 12 |
|---|---|---|---|---|---|---|---|---|---|---|---|---|
| | $E_b$ v | $E_o$ v | $I_o$ a | $g_o$ mho | $g_c$ mho | $-\frac{g_o}{I_o}$ | $\left(\frac{g_o}{g_c}\right)^2$ | $\frac{r_2}{r_1}<$ | $N_F$ (b=0) db | $N_F$ b=±0.1 db | $G_p$ db | BC |
| 1 | 0.06 | 0.01 | 0.88 | -2.7 | -1.6 | 3.1 | 2.8 | 1.6 | 8.8 | 8.9 | 10.5 | High |
| 2 | 0.08 | 0.04 | 0.74 | -3.8 | -2.9 | 5.1 | 1.7 | 1+ | 6.9 | 7.0 | 8.3 | " |
| 3 | 0.10 | 0.06 | 0.62 | -3.3 | -1.6 | 5.4 | 4.3 | 2.3 | 6.8 | 7.0 | 10.3 | " |
| 4 | 0.08 | 0.01 | 0.76 | -6.9 | 0.6 | 9.1 | 120 | | 5.1 | 8.5 | 26.8 | " |
| 5 | 0.20 | 0.01 | 0.14 | -1.3 | 0.08 | 9.3 | 260 | | 5.0 | 10.6 | 30.0 | " |
| 6 | 0.20 | 0.04 | 0.18 | -1.8 | 0.40 | 10.0 | 20 | | 4.8 | 5.6 | 19.0 | " |
| 7 | 0.15 | 0.06 | 0.46 | -4.3 | 0.46 | 10.7 | 87 | | 4.6 | 7.3 | 15.4 | " |
| 8 | 0.15 | 0.04 | 0.35 | -4.3 | 1.60 | 12.3 | 7.2 | | 4.2 | 4.5 | 14.6 | " |
| 9 | 0.20 | 0.10 | 0.26 | -3.2 | 1.70 | 12.3 | 3.6 | | 4.2 | 4.5 | 11.6 | " |
| 10 | 0.12 | 0.04 | 0.50 | -6.0 | 1.10 | 12.5 | 30.0 | | 4.2 | 5.3 | 20.8 | " |
| 11 | 0.12 | 0.02 | 0.47 | -6.6 | 0.75 | 13.0 | 78.0 | | 4.1 | 6.6 | 24.9 | " |
| 12 | 0.10 | 0.01 | 0.60 | -7.8 | 0.07 | 13.0 | 12.000 | | 4.1 | 25.0 | 46.8 | " |
| 13 | 0.15 | 0.01 | 0.29 | -4.0 | 0.50 | 13.8 | 64 | | 3.9 | 6.0 | 24.1 | " |
| 14 | 0.12 | 0.01 | 0.45 | -6.8 | 0.40 | 15.1 | 280 | | 3.7 | 9.4 | 30.5 | " |

NOTE:
IF THE GENERATOR AND INPUT CIRCUITS IMPEDANCES ARE MATCHED, THEN ADD 3 db TO $N_F$

Fig. 11.

INVENTOR.
CHARLES J. HIRSCH
BY Eugene M. Whitacre
ATTORNEY

United States Patent Office 3,235,806

Patented Feb. 15, 1966

3,235,806

SIGNAL TRANSLATING CIRCUIT

Charles J. Hirsch, Princeton, N.J., assignor to Radio Corporation of America, a corporation of Delaware Filed Sept. 21, 1961, Ser. No. 139,633
2 Claims. (Cl. 325—449)

This invention relates to frequency converter or mixer circuits, and more particularly to frequency converter or mixer circuits of the type using negative resistance diodes such as tunnel diodes.

It is an object of this invention to provide a negative resistance diode frequency converter or mixer circuit which exhibits improved noise performance.

The current at signal frequency in the input circuit of a diode converter or mixer is produced by two components. The first component is the current produced by a signal frequency voltage applied to the converter. The second component is the current produced by the conversion of the first component of current to the output frequency and back to the input frequency. In general the two components of current are of a phase to cancel each other, but the second current component is smaller than the first component because of the conversion losses through the diode.

In accordance with the invention, the above noted cancellation effect is used to advantage to provide improved noise performance in a negative resistance diode converter. The noise factor of the frequency converter is determined in part by noise originating at the output frequency due to (1) the diode and (2) the output circuit. In a manner similar to that noted above, the noise current at the output frequency is essentially comprised of two components. The first component of noise current in the output circuit is produced by the noise voltages originating at the output frequency. The second component results from the bilateral nature of diode converters wherein the first component of noise current is converted to the signal frequency, and back from the signal to the output frequency. As mentioned above, the first and second components are in a phase to cancel each other. However the negative resistance of the diode makes it possible for the noise current to be converted from one frequency to another with power gain so that the first and second components of noise current may be made substantially equal so that they may cancel each other.

The relative magnitudes of the first and second components of noise current at output frequency are primarily a function of the average conductance of the diode and the input resistance of the converter. The input resistance $r_1$, is considered to be the equivalent of the source or generator impedance and the impedance of the converter input circuits tuned to the signal frequency. The average conductance $g_o$ is determined by the D.-C. biasing voltage and the magnitude of the heterodyne oscillator voltage applied to the diode. The first and second components of noise are substantially equal and cancel when the relationship of the input resistance to the average conductance satisfies the condition, $1+r_1g_o=0$. To satisfy this condition $g_o$ must be negative, and this can be achieved by biasing the diode in the negative resistance portion of its current-voltage characteristic.

When the aforestated condition is satisfied, it has been found that the noise figure of the converter is primarily a function of the D.-C. diode current, $I_o$, and the average diode conductance, $g_o$. The higher the absolute value of the ratio of average conductance to the D.-C. diode current, the lower the noise figure. The maximum absolute value of the ratio of the average conductance to D.-C. diode current which may be achieved is a function of the particular diode characteristics. At the present state of the art germanium tunnel diodes can, if properly operated, provide a higher ratio of $|g_o/I_o|$ than gallium arsenide or other III–V compound diodes.

In the construction of a negative resistance diode frequency converter in accordance with one embodiment of the invention, the diode is biased so as to produce a negative average conductance, and D.-C. bias and local oscillator drive are adjusted to provide the largest value of $|g_o/I_o|$. The input resistance of the converter as defined above is then selected to satisfy the condition $1+r_1g_o=0$. Under these conditions, the first and second components of noise current are of substantially equal amplitude and opposite phase, so they cancel, thereby reducing the noise figure of the converter.

If, in a particular converter circuit design, the condition $1+r_1g_o=0$ is not satisfied, then the converter noise figure is a function not only of the ratio $|g_o/I_o|$ mentioned above, but is also a function of the ratio of the absolute value of the average conductance $g_o$ to the conversion conductance $g_c$ of the diode. The conversion conductance, like the average conductance is a function of the D.-C. bias voltage and the local oscillator drive applied to the diode. It has been found that when the condition $1+r_1g_o=0$ is not satisfied, the smaller the value $(g_o/g_c)^2$, the lower the noise figure. However, $g_c$ should not exceed $g_o$ for stability reasons to be discussed hereinafter.

In accordance with another embodiment of the invention, a frequency converter including negative resistance diode, such as a tunnel diode, is biased in the negative resistance region of its current-voltage characteristic. Since the operating conditions for the maximum value of $|g_o/I_o|$ usually produces very large values of $(g_o/g_c)^2$, for presently available negative resistance tunnel diodes, the D.-C. bias voltage and local oscillator voltage drive are adjusted to provide the maximum value of $|g_o/I_o|$ consistent with a low value of $(g_o/g_c)^2$. In other words the value $|g_o/I_o|$ may not be at the maximum achievable for the particular diode used, but will be at the largest possible value that corresponds to the operating conditions producing a low or near minimum value of $(g_o/g_c)^2$. These operating conditions permit a degree of tolerance so that when the condition $1+r_1g_o=0$ is not satisfied, the noise figure of the converters is not greatly deteriorated.

The novel features that are considered to be characteristic of this invention are set forth with particularity in the appended claims. The invention itself however, both as to its organization and method of operation, as well as additional objects and advantages thereof, will best be understood from the following description when read in connection with the accompanying drawings, in which:

FIGURE 8 is an equivalent diagram of showing the noise current circuit for noise contributed by the tunnel diode;

FIGURE 9 is a schematic circuit diagram of the circuit of FIGURE 8 converted by Thevenin's theorem to an equivalent series circuit in a tunnel diode;

FIGURE 10 is a table showing the relationship in a tunnel diode of D.-C. current $I_0$, average conductance $g_0$, and conversion conductance $g_c$ for various D.-C. bias and oscillator voltages; and FIGURE 11 is a table showing the noise factor of a frequency converter for various values of D.-C. bias and oscillator voltages applied to the tunnel diode.

One type of negative resistance diode which may be used in frequency converters embodying the invention is known as a tunnel diode. The constructural details of such diode are discussed in an article entitled "Tunnel Diodes as High Frequency Devices" by H. S. Sommers, Jr. appearing in the Proc. IRE, p. 1201 et seq., July 1959.

(I) TUNNEL DIODE CHARACTERISTIC

Figure 1:
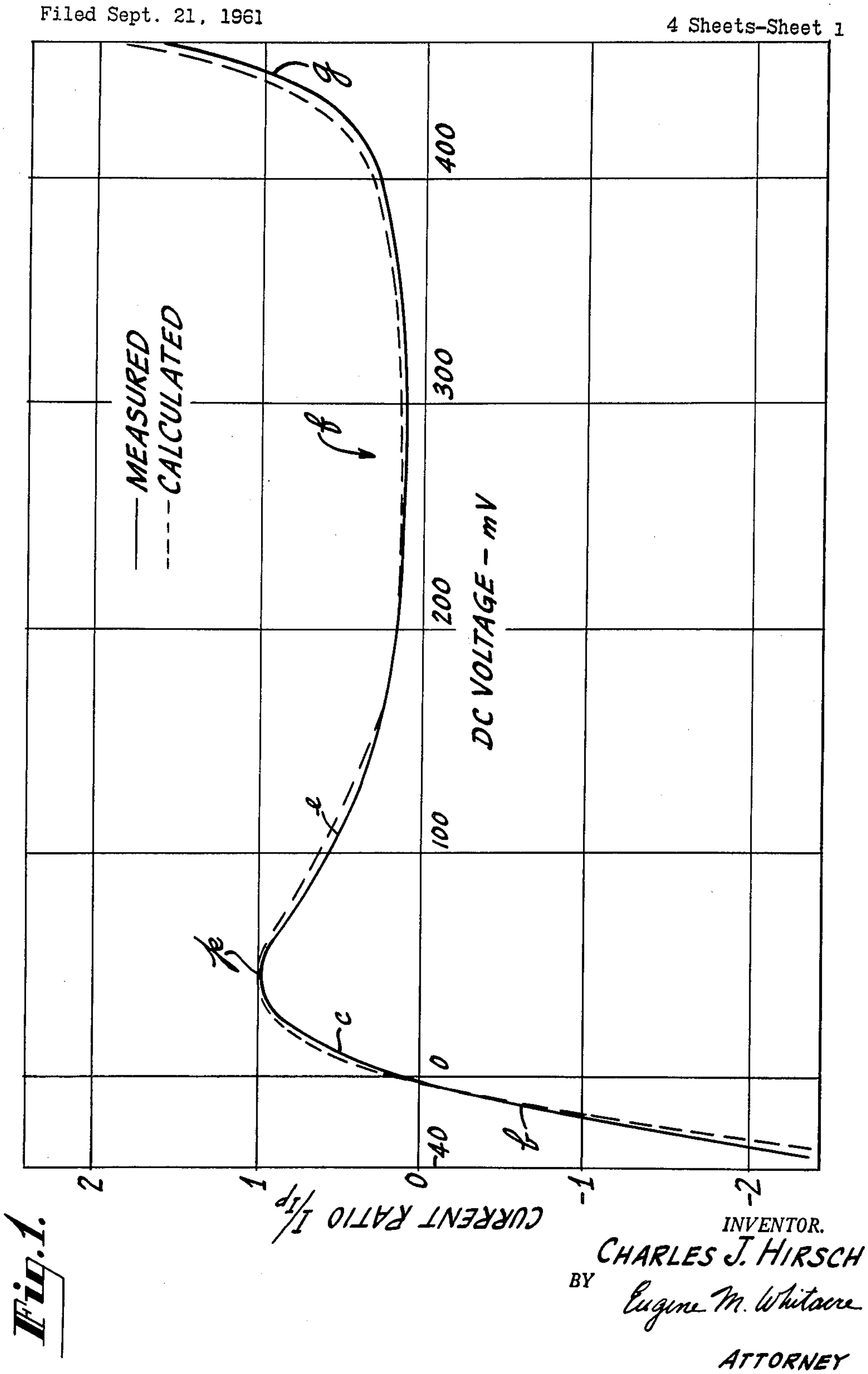
FIGURE 1 is a graph illustrating the current-voltage characteristic of a typical tunnel diode.

The measured and computed current-voltage characteristics of a typical germanium tunnel diode is shown in FIGURE 1. The current scales depend on the area and doping of the junction, but representative currents are in the milliampere range. In the present case the current scales correspond to the ratio $I/I_p$ where I is the current through the diode for a given D.-C. bias voltage and $I_p$ is the current maximum at the point $p$.

For a small reverse voltage the current through the diode increases in the reverse direction as a function of voltage as is indicated by the region $b$ of FIGURE 1.

For small forward bias voltages, the characteristic is substantially symmetrical (FIGURE 1, region $c$). According to present theory, the forward current results from quantum mechanical tunneling. At higher forward bias voltages, the forward current (believed due to quantum mechanical tunneling) reaches a maximum (at point $p$), and then begins to decrease. This drop continues (FIGURE 1, region $e$) to a current minimum point $f$, and eventually normal injection over the barrier becomes important and the characteristic turns into the usual forward behavior, (region $g$, FIGURE 1).

The current-voltage characteristic of the diode may be approximated by a power series extending to the 10th order as:

$$i=a_0+a_1e+a_2e^2+a_3e^3 \dots +a_{10}e^{10} \qquad (1.1)$$

The conductance of the diode is then:

$$G=\frac{di}{de}=a_1+2a_2e+3a_ce^2+ \dots +10a_{10}e^9 \qquad (1.2)$$

The values of $a_0$, $a_1$, etc., were computed from data obtained from a 1N3218 germanium tunnel diode to be:

| | |
|---|---|
| $a_0=-1.98\times10^2$ | $a_6=1.012\times10^5$ |
| $a_1=4.25\times10$ | $a_7=1.33\times10^5$ |
| $a_2=-6.42\times10^2$ | $a_8=-8.30\times10^5$ |
| $a_3=3.17\times10^3$ | $a_9=1.17\times10^6$ |
| $a_4=-5.27\times10^2$ | $a_{10}=-5.43\times10^5$ |
| $a_5=-4.29\times10^4$ | (1.3) |

(II) THE FREQUENCY CONVERTER CIRCUIT

Figure 2:
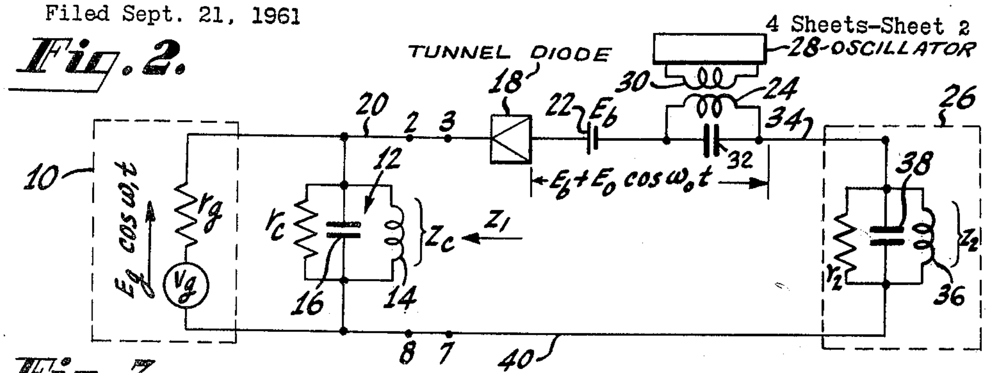
FIGURE 2 is a schematic circuit diagram of a negative resistance diode frequency converter embodying the invention.

A tunnel diode frequency converter circuit is shown in FIGURE 2. A signal source 10, shown in the dashed rectangle as comprising a signal generator $V_g$ having an internal resistance $r_g$, generates a voltage $E_g \cos w_1t$. The signal source 10 represents the equivalent circuit of an antenna, amplifier, or other signal generating or translating means.

Signal voltage from the signal source 10 is applied to the converter tuned input circuit 12. The tuned circuit 12 includes a parallel connected inductor 14 and capacitor 16 resonant at the frequency of the signals supplied by the source 10. In the case where the source 10 comprises an antenna circuit, the tuned circuit 12 is tuned to the frequency of the signals which are to be received. At resonance the impedance $Z_c$ of the tuned circuit 12 is the resistance of the circuit represented by the resistor $r_c$ connected across the circuit. It should be understood that the resistor $r_c$ may not actually be a physical resistor but represents the resistance of the elements and connections of the tuned circuit 12.

The frequency converter tuned input circuit 12 is connected to a tunnel diode 18 through a conductor 20. The tunnel diode 18 is biased by a battery 22, or other suitable D.-C. source, to the desired operating point as will be described hereinafter. One terminal of the battery 22 is connected to the anode of the diode 18, and the other terminal of the battery 22 is connected through an inductor 24, an output circuit 26, and the input circuit 12 both to the cathode of the diode 18. The D.-C. biasing circuit is shown only by way of example, and may if desired be comprised of a suitable voltage dividing network with a variable resistor to adjust the bias applied to the diode. In practice such a voltage divider network may include a resistor, across which the bias voltage is developed, connected in the D.-C. current path of the diode, and bypassed by a capacitor which offers low impedance to signal and output frequencies. It will be observed that the input and output circuits 12 and 26 offer very little resistance to direct current flow.

A suitable heterodyne oscillation generator 28 supplies an oscillator signal $E_o \cos w_ot$ to an inductive loop 30, which is coupled to the inductor 24. The inductor 24 is tuned to the oscillator frequency by a capacitor 32.

The inductor 24 is connected through a conductor 34 to the output circuit 26. The output circuit 26 is tuned to the intermediate frequency by an inductor 36 connected in parallel with a capacitor 38. The impedance $Z_2$ of the output circuit at resonance is represented by the resistor $r_2$ connected across the circuit. As is the case of the input circuit, the resistor $r_2$ does not necessarily represent a physical resistor.

A common, or ground conductor 40 interconnects the signal source 10, and the input and output circuits 12 and 26 respectively.

(III) GENERAL

To understand the requirements for low noise operation of a tunnel diode frequency converter, the system noise figure will be derived and examined. The system noise figure includes noise contributions by:

(a) The input circuit at the signal frequency
(b) The output circuit at the output or intermediate frequency
(c) The tunnel diode 18 at both frequencies In order to calculate the individual noise contributions noted above, the relations for linear and conversion conductances for the currents at signal frequency ($w_1$) and at the output or intermediate frequency ($w_2$) must be derived, as well as equations for amplification bandwidth, and power gain.

(IV) DETERMINATION OF SIGNAL AND INTERMEDIATE FREQUENCY CURRENTS

Figures 3, 4, 5, 6, 7:
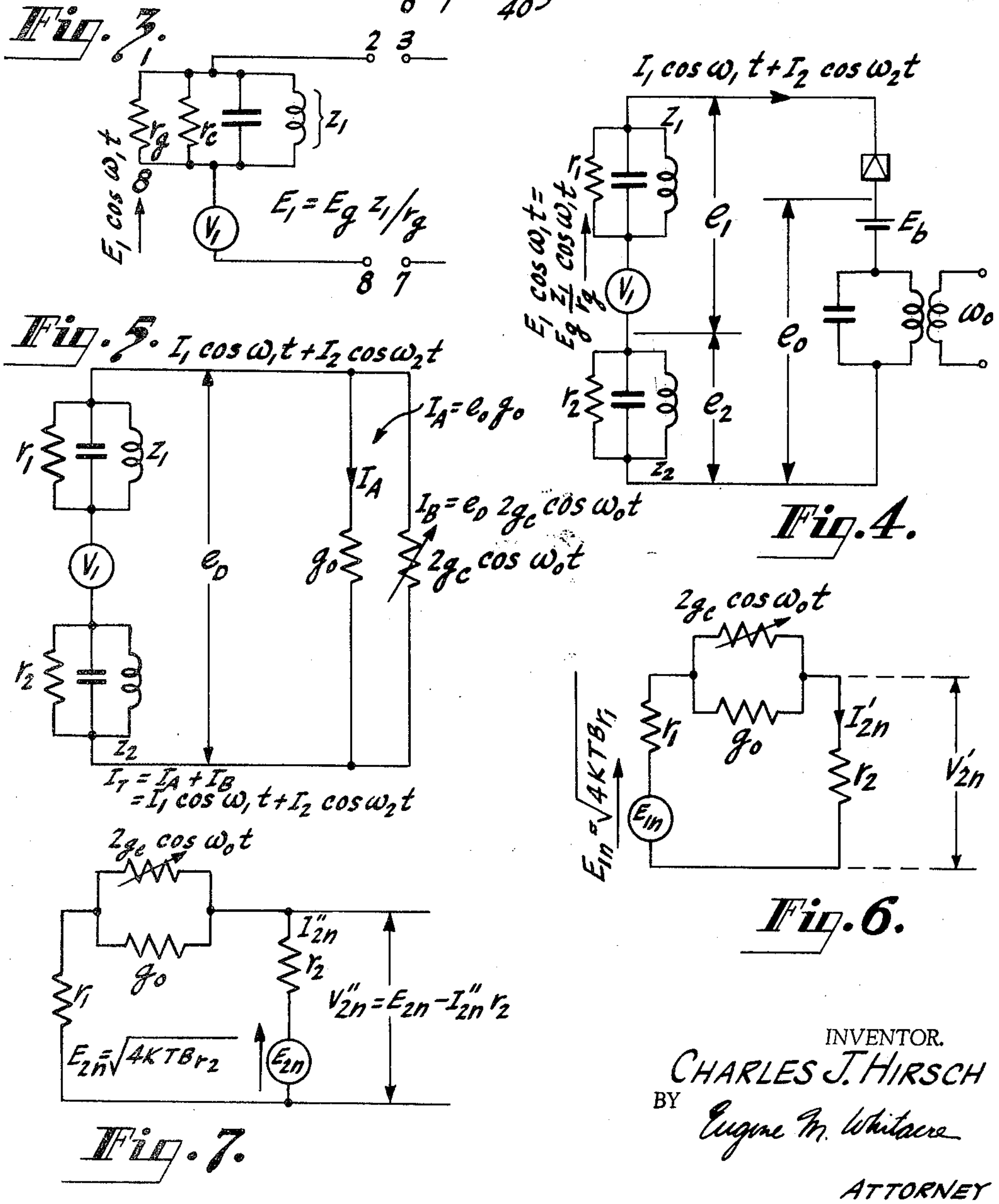
FIGURE 3 is a schematic circuit diagram of the input circuit portion of the circuit of FIGURE 2 converted by Thevenin's theorem to its equivalent circuit with the elements connected in series.
FIGURE 4 is a schematic circuit diagram showing the converter circuit of FIGURE 2 converted in accordance with Thevenin's theorem to its equivalent circuit for the elements connected in series.
FIGURE 5 is a schematic circuit diagram similar to that of FIGURE 4 except that the tunnel diode and local oscillator source are represented by the equivalent average and conversion conductances of the diode.
FIGURES 6 and 7 are equivalent diagrams showing the noise current circuits for noise contributed at the signal and output frequencies respectively.

For convenience in calculation, the signal source 10 and input circuit 12 portion of the converter circuit is converted by Thevenin's Theorem to that shown in FIG. 3, where all elements are in series. The generated voltage is changed to the voltage appearing across points 2, 8 when connection 2–3 is open; this voltage is $$Eg \cos w_1t\left(\frac{Z_c}{r_g+Z_c}=\frac{1}{r_g}\frac{r_gZ_c}{r_g+Z_c}=\frac{Z_1}{r_g}\right)=E_g\frac{Z_1}{r_g}\cos w_1t$$
$$=E_1 \cos w_1t$$

The internal impedance of the generator is equal to $Z_1$ ($r_g$ and $Z_c$ in parallel). This transformation is shown in FIGS. 3 and 4.

The converter action introduces currents at the input signal frequency ($w_1$) and the output or intermediate frequency ($w_2$), so that the total current flowing in the series circuit is generalized:

$$I_T = I_1 \cos w_1 t + I_2 \cos w_2 t \qquad (2)$$

The first task of the analysis is to determine $I_1$ and $I_2$. For simplification, assume that $Z_2=0$ for frequencies not equal to the intermediate frequency and $Z_1=0$ for frequencies not equal to the signal frequency.

From FIG. 4, the voltages applied to the diode are seen to be:

(1) A D.-C. bias voltage and a strong local oscillator voltage:

$$e_o = E_o \cos w_o t + E_b \qquad (2.1)$$

(2) A weak signal voltage:

$$e_1 = (E_1 - I_1 Z_1) \cos w_1 t \qquad (2.2)$$

(3) A weak reversed I-F voltage:

$$e_2 = -I_2 Z_2 \cos w_2 t \qquad (2.3)$$

Since $e_o$ is much larger than $e_1$ and $e_2$, it, $e_o$, establishes a dynamic conductance, $g$, obtained by substituting $e_o$ for $e$ in Equation 1.2, resulting in:

$$g = a_1 + 2a_2 e_o + 3a_3 e_o^2 + \ldots + 10 a_{10} e_o^9 \qquad (2.4)$$

expanding $e_o^m = (E_b + E_o \cos w_o t)^m$, where $m=1, 2 \ldots 9$, substituting in (2.4), and collecting terms results in:

$$g = g_o + 2g_c \cos w_o t + 2g_c^1 \cos 2w_o t + \ldots \qquad (2.4.1)$$

If we bind the computation of $g_o$ and $g_c$ to the first three terms of Equation 2.4 then:

$$g_o = a_1 + 2a_2 E_b + 2a_3\left[E_b^2 + \frac{E_o^2}{2}\right]$$

$$g_c = [a_2 + 3a_3 E_b] E_o$$

However $g_o$, $2g_c$, have been computed for all terms of Equation 2.4 and some values are shown in FIGURE 10, as functions of the D.-C. bias voltage ($E_b$) and the local oscillator voltage ($E_o$).

Neglecting the term $2g_c^1 \cos 2w_o t$ for simplicity, the diode is seen to effectively consist of two conductances in parallel, namely:

$g_o$, a constant conductance producing currents having the same frequency as the voltage applied to it and linearly related to that voltage; and $2g_c \cos w_o t$, a conversion conductance, varying at the frequency of the local oscillator, which converts $w_1$ to $w_2 = w_o - w_1$, and $w_2$ to $w_1 = w_o - w_2$.

These two conductances are schematically represented in FIG. 5.

(V) VOLTAGE AND CURRENT RELATIONS

From FIG. 5, the total voltage $e_D$ applied to the parallel conductances is seen to be:

$$e_D = (E_1 - I_1 Z_1) \cos w_1 t - I_2 Z_2 \cos w_2 t \qquad (3.1)$$

$e_D$ produces a current $I_A$ in $g_o$ equal to $$I_A = g_o e_D = g_o (E_1 - I_1 Z_1) \cos w_1 t - g_o I_2 Z_2 \cos w_2 t \qquad (3.2)$$

$e_D$ produces a current $I_B$ in $2g_c \cos w_o t$ equal to $$\begin{aligned} I_B = e_D . 2g_c \cos w_o t &= 2g_c (E_1 - I_1 Z_1) \cos w_1 t \cos w_o t \\ &\quad - 2g_c I_2 Z_2 \cos w_2 t \cos w_o t \\ &= g_c (E_1 - I_1 Z_1) \cos w_2 t - g_c I_2 Z_2 \cos w_1 t \end{aligned} \qquad (3.3)$$

The total current $I_T$ through the generator and the load is:

$$\begin{aligned} I_T = I_A + I_B &= [g_o (E_1 - I_1 Z_1) - g_c I_2 Z_2] \cos w_1 t \\ &\quad + [g_c (E_1 - I_1 Z_1) - g_o I_2 Z_2] \cos w_2 t \end{aligned} \qquad (3.4.1)$$

$$= I_1 \cos w_1 t + I_2 \cos w_2 t \qquad (3.4.2)$$

From 3.4.1 and 3.4.2, the currents at $w_1$ and $w_2$ are seen to be:

$$I_1 \cos w_1 t = [g_o (E_1 - I_1 Z_1) - g_c I_2 Z_2] \cos w_1 t \qquad (3.5.1)$$

$$I_2 \cos w_2 t = [g_c (E_1 - I_1 Z_1) - g_o I_2 Z_2] \cos w_2 t \qquad (3.5.2)$$

Equation 3.5.1 shows that the total current at $w_1$ is equal to that produced by the voltage $(E_1 - I_1 Z_1) \cos w_1 t$ applied to $g_o$, minus the current, produced by $I_2 Z_2 \cos w_2 t$ applied to the conversion conductance $g_c$, converted to $w_1$.

From 3.5.1 and 3.5.2

$$(1 + g_o Z_1) I_1 + g_c Z_2 I_2 = g_o E_1 \qquad (3.6.1)$$

$$g_c Z_1 I_1 + (1 + g_o Z_2) I_2 = g_c E_1 \qquad (3.6.2)$$

These equations solved for $I_1$ and $I_2$ become:

$$I_1 = \frac{g_o (1 + g_o Z_2) - g_c^2 Z_2}{(1 + g_o Z_1)(1 + g_o Z_2) - g_c^2 Z_1 Z_2}\left(E_1 = E_g \frac{Z_1}{r_g}\right) \qquad (3.7)$$

$$I_2 = \frac{g_c}{(1 + g_o Z_1)(1 + g_o Z_2) - g_c^2 Z_1 Z_2}\left(E_1 = E_g \frac{Z_1}{r_g}\right) \qquad (3.8)$$

By symmetry it is seen that the current $I_2' \cos w_2 t$ produced by a voltage $E_2 \cos w_2 t$ is given by $$I_2' = \frac{g_o (1 + g_o Z_1) - g_c^2 Z_1}{(1 + g_o Z_1)(1 + g_o Z_2) - g_c^2 Z_1 Z_2} E_2 \qquad (3.9)$$

At resonance, $Z_1 = r_1$; $Z_2 = r_2$ so that $$I_1 = \frac{g_o (1 + g_o r_2) - g_c^2 r_2}{(1 + g_o r_1)(1 + g_o r_2) - g_c^2 r_1 r_2}\left(E_1 = E_g \frac{r_1}{r_g}\right) \qquad (3.7.1)$$

$$I_2 = \frac{g_c}{(1 + g_o r_1)(1 + g_o r_2) - g_c^2 r_1 r_2}\left(E_1 = E_g \frac{r_1}{R_g}\right) \qquad (3.8.1)$$

$$I_2' = \frac{g_o (1 + g_o r_1) - g_c^2 r_1}{(1 + g_o r_1)(1 + g_o r_2) - g_c^2 r_1 r_2} E_2 \qquad (3.9.1)$$

The circuit is stable when the total circuit conductance $G_1$ is positive at $w_1$ and the total positive circuit conductance $G_2$ is positive at $w_2$ or:

$$G_1 = \frac{I_1}{E_1} = \frac{g_o (1 + g_o r_2) - g_c^2 r_2 = N_1}{(1 + g_o r_1)(1 + g_o r_2) - g_c^2 r_1 r_2 = D} > 0 \qquad (3.7.2)$$

and $$G_2 = \frac{I_2'}{E_2} = \frac{g_o (1 + g_o r_1) - g_c^2 r_1 = N_2}{(1 + g_o r_1)(1 + g_o r_2) - g_c^2 r_1 r_2 = D} > 0 \qquad (3.9.2)$$

(VI) AMPLIFICATION, BANDWIDTH, AND POWER GAIN

Repeating (3.8)

$$I_2 = \frac{g_c}{(1 + g_o Z_1)(1 + g_o Z_2) - g_c^2 Z_1 Z_2} E_g \frac{Z_1}{r_g} \qquad (3.8)$$

Divide the numerator and denominator by $Z_1 Z_2$ $$I_2 = \frac{g_c / Z_2}{\left(\frac{1}{Z_1} + g_o\right)\left(\frac{1}{Z_2} + g_o\right) - g_c^2} \; \frac{E_g}{r_g}$$

The output voltage is $I_2 Z_2$ so that the amplification A is $$A = \frac{I_2 Z_2}{E_g} = \frac{g_c / r_g}{\left(\frac{1}{Z_1} + g_o\right)\left(\frac{1}{Z_2} + g_o\right) - g_c^2} \qquad (4.1)$$

For simplification, we will assume the output circuit to be so broadly tuned that $Z_2 = r_2$ over the whole 3 db bandwith of the converter.

$$\frac{1}{Z_1} \simeq \frac{1 - jQ_1 2d / w_1}{r_1} \qquad (4.2)$$

where $$Q = r_1 / w_1 L = r_1 w C_1 \qquad (4.2.1)$$

$d = w_1 - w =$ departure from res.

Substitute (4.2) as well as $Z_2 = r_2$ in (4.1):

$$A = \frac{I_2 r_2}{E_g} = \frac{g_c / r_2}{\left(\frac{1 - jQ2d/w_1}{r_1} + g_o\right)\left(\frac{1}{r_2} + g_o\right) - g_c^2} =$$

$$\frac{g_c / r_g}{\left(\frac{1}{r_1} + g_o\right)\frac{1}{r_2} + g_o - g_c^2 - j\left(\frac{1}{r_2} + g_o\right)\left(\frac{Q_1}{r_1}\frac{2d}{w_1}\right)} \qquad (4.3)$$

At resonance $d=0$, and $$A=\frac{I_2 r_2}{E_g}=\frac{g_c/r_g}{\left(\frac{1}{r_1}+g_o\right)\left(\frac{1}{r_2}+g_o\right)-g_c^2} \tag{4.3.1}$$

The value of $d$ which reduces A by 3 db is given by:

$$\left(\frac{1}{r_2}+g_o\right)\left(\frac{Q_1}{r_1}\frac{2d_1}{w_1}\right)=\left(\frac{1}{r_1}+g_o\right)\left(\frac{1}{r_2}+g_o\right)-g_c^2 \tag{4.4}$$

Since Equation 4.3 is symmetrical about resonance, the total bandwidth $B=2d_1$. Clearing of fractions:

$$(1+g_o r_2)Q_1\frac{2d_1}{w_1}=(1+g_o r_1)(1+g_o r_2)-g_c^2 r_1 r_2$$

From 4.2.1; $Q=r_1 w_1 C_1$ $$(1+g_o r_2)r_1 C_1 B=(1+g_o r_1)(1+g_o r_2)-g_c^2 r_1 r_2$$

$$BC_1=\frac{(1+g_o r_1)(1+g_o r_2)-g_c^2 r_1 r_2}{(1+g_o r_2)r_1} \tag{4.5}$$

The power output $P_o$ at resonance is from (3.8.1)

$$P_o=I_2^2 r_2=\left[\frac{g_c}{(1+g_o r_1)(1+g_o r_2)-g_c^2 r_1 r_2}\right]^2 E_g^2\frac{r_1^2}{r_g}r_2 \tag{4.6}$$

The available input power $P_a$ is:

$$P_a=E_g^2/4r_g \tag{4.7}$$

so that the power gain $G_P$ is:

$$G_P=\frac{P_o}{P_a}=\left[\frac{g_c}{(1+g_o r_1)(1+g_o r_2)-g_c^2 r_1 r_2}\right]^2 E_g^2\left(\frac{r_1}{r_g}\right)^2 r_2\cdot\frac{4rg}{E_g^2}$$

$$=\frac{r2}{r_g}\left[\frac{2g_c r_1}{(1+g_o r_1)(1+g_o r_2)-g_c^2 r_1 r_2}\right]^2 \tag{4.8}$$

(A) *Noise generated by the generator and input circuit*

Referring to FIGURE 7, the output current $I_{2n}$ produced by $\sqrt{4KTBr_1}$ is obtained by substituting this value for $E_1$ in Equation 3.8.1 so that:

$$I_{2n}'=\frac{g_c\sqrt{4KTBr_1}}{(1+g_o r_1)(1+g_o r_2)-g_c^2 r_1 r_2} \tag{5.3}$$

This produces an output voltage:

$$V_{2n}'=I_{2n}r_2$$

which when squared becomes $$(V_{2n}')^2=(I_{2n}r_2)^2=\frac{g_c^2 4KTBr_1 r_2^2}{[(1+g_o r_1)(1+g_o r_2)-g_c^2 r_1 r_2]^2}$$

Multiplying by $r_g/r_g$ and regrouping:

$$(V_{2n}')^2=KTB\left\{\frac{r_2}{r_g}\left[\frac{2g_c r_1}{(1+g_o r_1)(1+g_o r_2)-g_c^2 r_1 r_2}\right]^2\right\}r_2\cdot\frac{r_g}{r_1}$$

The quantity in the bracket is equal to $G_P$ (see 4.8) so that:

$$(V_{2n}')^2=KTBG_P r_2\cdot\frac{r_g}{r_1} \tag{5.4}$$

(B) *Noise generated by the output circuit at $w_2$*

Referring to FIGURE 7, this circuit produces a thermal noise voltage $$E_{2n}=\sqrt{4KTBr_2} \tag{5.2}$$

which produces a current:

$$I_{2n}'=\frac{g_o(1+g_o r_1)-g_c^2 r_1}{(1+g_o r_1)(1+g_o r_2)-g_c^2 r_1 r_2}\sqrt{4KTBr_2}$$

The output noise voltage is seen from FIGURE 7 to be $$V_{2n}''=E_{2n}-I_{2n}''r_2=E_{2n}\left[1-\frac{g_o r_2(1+g_o r_1)-g_c^2 r_1 r_2}{(1+g_o r_1)(1+g_o r_2)-g_c^2 r_1 r_2}\right]=E_{2n}\frac{1+g_o r_1}{(1+g_o r_1)(1+g_o r_2)-g_c^2 r_1 r_2}$$

$$(V_{2n}'')^2=KTBr_2\left\{\frac{r_2}{r_g}\left[\frac{2g_c r_1}{(1+g_o r_1)(1+g_o r_2)-g_c^2 r_1 r_2}\right]^2\right\}\frac{r_g}{r_2}\left[\frac{1+g_o r_1}{g_c r_1}\right]^2=KTBG_p r_2\cdot\frac{r_g}{r_2}\left[\frac{1+g_o r_1}{g_c r_1}\right]^2 \tag{5.5}$$

From (4.5):

$$(1+g_o r_1)(1+g_o r_2)-g_c^2 r_1 r_2=(1+g_o r_2)r_1 BC_1$$

Substituting in 4.8:

$$G_P=\frac{r_2}{r_g}\left[\frac{2g_c r_1}{(1+g_o r_2)r_1 BC}\right]^2$$

$$G_P B^2=\frac{r_2}{r_g}\left[\frac{2g_c}{(1+g_o r_2)C}\right]^2$$

$$\sqrt{G_P B}=\frac{2g_c}{(1+g_o r_2)C}\sqrt{\frac{r2}{r_g}} \tag{4.9}$$

(VII) NOISE

Contribution to noise comes from:

A. The combined resistance ($r_1$) of the generator and input tuned circuit 12, producing a noise voltage $E_{1n}$ at the signal frequency ($w_1$).

$$E_{1n}=\sqrt{4KTBr_1} \tag{5.1}$$

where $K$=Boltzman's constant
$T$=Absolute temperature
$B=2\pi$ bandwidth

B. The output load resistance $r_2$ which produces a noise voltage $E_{2n}$ at the IF frequency $w_2$ $$E_{2n}=\sqrt{4KTBr_2} \tag{5.2}$$

C. The tunnel diode noise generated at the signal frequency ($w_1$).

D. The tunnel diode noise generated at the IF frequency $w_2$.

(C) *Noise contributed by the tunnel diode*

This noise can be considered to be supplied by a noise current, $i_n$, from a constant-current generator $I_k$ connected across the diode as in FIGURE 8, and equal to:

$$i_n=\sqrt{2qI_oB}=20I_o\times 4KTB$$

where $q$=the electron charge
$I_o$=the average D.C. current
$B=2\pi$ times the bandwidth The diode, local oscillator, and bias are replaced by the two equivalent parallel conductances $g_o$ and $2g_c \cos w_o t$ as shown in FIGURE 8.

By application of Thevenin's Theorem, the constant-current generator, $I_k$, and the shunt conductance, $g_o$, are replaced by a constant-voltage generator whose open circuit voltage is $i_n/g_o$, and whose internal resistance is $1/g_o$ as shown in FIG. 9. $Z_1$ and $Z_2$ are assumed to be tuned and become $r_1$ and $r_2$. $Z_k=0$ when $w\neq w_k$.

Assuming $Z_k=0$ when $w\neq w_k$, the image frequency noise can be neglected and only the noise currents at signal frequency, $in_1 \cos w_1 t$, and at the intermediate frequency, $in_2 \cos w_2 t$, will be considered.

The conversion conductance $2g_c \cos w_o t$ converts noise at $w_1$ to noise at $w_2$ and vice versa, so that the total noise current $I_{Tn}$ through the generator $V_c$ is:

$$I_{Tn}=I_{1n}\cos w_1 t+I_{2n}\cos w_2 t \tag{5.7}$$

The voltage $e_{ab}$ across points $a$, $b$ is equal to that of the generator minus the voltage drop in $1/g_o$, or $$e_{ab}=\frac{i_n}{g_o}-\frac{I_{Tn}}{g_o}=\frac{i_n}{g_o}-\frac{1}{g_o}(I_{1n}\cos w_1t+I_{2n}\cos w_2t) \quad (5.8)$$

For noises generated at the signal frequency $w_1$ and at the IF frequency $w_2$, Equation 5.7 becomes $$e_{ab}'=\frac{in_1-I_{in}'}{g_o}\cos w_1t-\frac{I_{2n}'}{g_o}\cos w_2t \quad (5.8.1)$$

$$e_{ab}''=\frac{in_2-I_{2n}''}{g_o}\cos w_2t-\frac{I_{in}}{g_o}\cos w_1t \quad (5.8.2)$$

Consider first the voltage due to noise at signal frequency $e_{ab}'$. When applied to path C, of the circuit of FIG. 9, it produces a current $I_c=e_{ab}'/(r_1+r_2)$ but because $r_k=0$, when $w\neq w_k$, the current really is:

$$I_c=\frac{in_1-I_{1n}'}{g_or_1}\cos w_1t-\frac{I_{2n}'}{g_or_2}\cos w_2t \quad (5.9.1)$$

$e_{ab}'$ applied to $2g_c\cos w_ot$ (path D) produces:

$$I_d=e_{ab}'\cdot 2g_c\cos w_ot=$$

$$2g_c\cos w_ot\left(\frac{in_1-I_{1n}'}{g_o}\cos w_1t-\frac{I_{2n}^1}{g_o}\cos w_2t\right)=$$

$$\frac{g_c}{g_o}(in_1-I_{in}')\cos w_2t-\frac{g_c}{g_o}I_{2n}'\cos w_1t \quad (5.9.2)$$

The total current through the generator is:

$$I_{Tn}=I_c+I_d=\left(\frac{in_1-I_{in}'}{g_or_1}-\frac{g_c}{g_o}I_{2n}'\right)\cos w_1t+$$

$$\left[\frac{g_c}{g_o}(in_1-I_{in})-\frac{I_{2n}}{g_or_1}\right]\cos w_2t=I_{in}'\cos w_1t+I_{2n}'\cos w_2t$$

from which $$I_{in}\cos w_1t=\left(\frac{in_1-I_{in}'}{g_or}-\frac{g_c}{g_o}I_{2n}'\right)\cos w_1t$$

$$I_{2n}\cos w_2t=\left[\frac{g_c}{g_o}(in_1-I_{in}')-\frac{I_{2n}'}{g_or_2}\right]\cos w_2t$$

These two equations become:

$$(1+g_or_1)I_{in}'+g_cr_1I_{2n}'=in_1 \quad (5.10.1)$$

$$g_cr_2I_{in}'(1+g_or_2)I_{2n}'=g_cr_{2in1} \quad (5.10.2)$$

These two equations solved for $I_{1n}'$ and $I_{2n}'$ give:

$$I_{in}'=\frac{(1+g_or_2)-g_c^2r_1r_2}{(1+g_or_1)(1+g_or_2)-g_c^2r_1r_2}in_1 \quad (5.11)$$

$$I_{2n}'=\frac{g_og_cr_1r_2}{(1+g_or_1)(1+g_or_2)=g_c^2r_1r_2}in_1 \quad (5.12)$$

The noise current produced by the tunnel diode at $w_2$ can be derived from (5.11) by inspection and is obtained from it by substituting $I_{2n}''$ for $I_{1n}'$; $r_1$ for $r_2$; $r_2$ for $r_1$; and $in_2$ for $in_1$. It is:

$$I_{2n}''=\frac{1+g_or_1-g_c^2r_1r_2}{(1+g_or_1)(1+g_or_2)-g_c^2r_1r_2}in_2 \quad (5.13)$$

The noise output voltage (at $w_2$) across $r_2$, due to the TD at $w_1$, is equal to the last term of 5.8.1 or, since $r_1=0$ when $w=w_2$:

$$V_{2n}'''=-\frac{I_{2n}'}{g_o}=\frac{g_cr_1r_2\sqrt{20I_o\times 4KTB}}{(1+g_or_1)(1+g_or_2)-g_c^2r_1r_2} \quad (5.14)$$

The noise output voltage (at $w_2$) across $r_2$, due to the TD noise at $w_2$, is equal to the first term of Equation 5.8.2 or:

$$V_{2n}''''=\frac{in_2-I_{2n}''}{g_o}=\frac{in_2}{g_o}\left[1-\frac{1+g_or_1-g_c^2r_1r_2}{(1+g_or_1)(1+g_or_2)-g_c^2r_1r_2}\right]$$

$$=\frac{in^2}{g_o}\left[\frac{(1+g_or_1)(1+g_or_2)-g_c^2r_1r_2-(1+g_or_1)+g_c^2r_1r_2}{(1+g_or_1)(1+g_or_2)-g_c^2r_1r_2}\right]$$

$$=\frac{in^2}{g_o}\frac{g_or_2(1+g_or_1)}{(1+g_or_1)(1+g_or_2)-g_c^2r_1r_2}$$

$$=\frac{r_2(1+g_or_1)\sqrt{20I_o\times 4KTB}}{(1+g_or_1)(1+g_or_2)-g_c^2r_1r_2} \quad (5.15)$$

Squaring $V_{2n}'''$ $$(V_{2n}''')^2=\frac{g_c^2r_1^2r_2^2 20I_o4KTB}{(1+g_or_1)(1+g_or_2)-g_c^2r_1r_2}$$

Multiplying by $r_g/r_g$ and rearranging terms $$(V_{2n}''')^2$$

$$=KTBr_2\frac{r_2}{r_g}\left\{\frac{4g_c^2r_1^2}{((1+g_or1)(1+g_or_2)-g_c^2r_1r)^2}\right\}20I_or_g$$

$$=KTBG_pr_2\cdot 20I_or_g \quad (5.16)$$

Squaring $V_{2n}''''$ $$(V_{2n}'''')^2=\frac{r_2^2(1+g_or_1)^2 20I_o\times KTB}{[(1+g_or_1)(1+g_or_2)-g_c^2r_1r_2]^2}$$

Multiplying by $$\frac{r_g\ g_c^2r_1^2}{r_g\ g_c^2r_1^2}$$

and rearranging terms $$(V_{2n}''')^2=$$

$$KTBr_2\left\{\frac{r_2}{r_g}\frac{4g_c^2r_1^2}{[(1+g_or_1)(1+g_or_2)-g_c^2r_1r_2]^2}\right\}20I_or_g\left[\frac{1+g_or_1}{g_cr_1}\right]^2$$

$$=KTBG_pr_2 20I_or_g\left[\frac{1+g_or_1}{g_cr_1}\right]^2 \quad (5.17)$$

(D) *Total (output noise-voltage)$^2$—$V_T^2$—from all sources*

$$V_T^2=(V_{2n}')^2+(V_{2n}'')^2+(V_{2n}''')^2+(V_{2n}'''')^2$$

from 5.4; 5.5; 5.15; and 5.16

$$V_T^2=KTBG_pr_2\left\{\frac{r_g}{r_1}+\frac{r_g}{r_2}\left[\frac{1+g_or_1}{g_cr_1}\right]^2+20I_or_g+20I_or_g\left[\frac{1+g_or_1}{g_cr_1}\right]^2\right\} \quad (5.18)$$

$V_T^2$ is the sum of all (noise-voltage)$^2$ at the output due to all causes.

The first term is the contribution of the generator and tuned input circuit.

The second term is the contribution of the output circuit.

The third term is the contribution of the tunnel diode at $w_1$.

The fourth term is the contribution of the tunnel diode at $w_2$.

(E) *(Ouput noise-voltage)$^2$—$V_{on}^2$—(due to the available input noise power)*

The available input noise power is KTB. It produces an output power $KTBG_p$, which produces a voltage $V_{on}$ across the output load $r_2$ such that:

$$\frac{V_{on}^2}{r_2}=KTBG_p$$

$$V_{on}^2=KTBG_pr_2 \quad (5.19)$$

(F) *Noise figures of the converter system, including sources of noise at the IF—$N_F$*

By definition:

$$N_F=\frac{V_T^2}{V_{on}^2}=\frac{r_g}{r_1}+\frac{r_g}{r_2}\left(\frac{1+g_or_1}{g_cr_1}\right)^2+20I_or_g+20I_or_g\left(\frac{1+g_or_1}{g_cr_1}\right)^2$$

Factoring out $r_g/r_1$ and rearranging $$N_F=\frac{r_g}{r_1}\left[1+20I_or_1+\left[\frac{1+g_or_1}{g_cr_1}\right]^2\left[\frac{r_1}{r_2}+20I_or_1\right]\right]$$

$$=\frac{r_g}{r_1}\left[1+20I_or_1+\frac{[1+g_or_1]^2[1+20I_or_2]}{g_c^2r_1r_2}\right] \qquad (5.20)$$

(VIII) EXAMINATION OF THE NOISE FIGURE

Since in a tunnel diode $g_o$ can be negative, it is possible to make $g_o=-1/r_1$, then $1+g_or_1=0$, and the formula for the noise figure reduces to:

$$N_F=\frac{r_g}{r_1}[1+20I_or_1]=\frac{r_g}{r_1}[1+20I_o/|g_o|] \qquad (6.1)$$

Making $1+g_or_1=0$, results in the cancellation of the noise originating at $w_2$ in the tunnel diode and in the output circuit. The term $r_g/r_1=2$ when the generator is matched to the input circuit and $r_g/r_1=1$ for a standing wave ratio $(SWR)=\infty$.

The term $g_o/I_o$ (in Equation 6.1) depends on the tunnel diode and on its operating parameters. The greater $g_o/I_o$, the conductance per unit of current, the lower the noise figure becomes.

Presently available tunnel diodes have been found to have a maximum value of $g_o/I_o=15.1$ so that it results in a value of:

$$N_F=1+\frac{20}{15.1}=3.65 \text{ db.}$$

Referring back to the relation for the noise-figure $$N_F=1+20I_or_1+\frac{(1+g_or_1)^2}{g_c^2r_1r_2}(1+20I_or_2) \qquad (5.2)$$

it is seen that if $1+g_or_1$ is not exactly equal to zero, but equal to say $\pm 0.1$, then a large value of $g_c^2r_1r_2$ is desired to keep the value of $N_F$ low.

It is shown hereinafter that the circuit is stable if:

$$\frac{g_c}{g_o}<1;\ 1<\frac{r_2}{r_1}<\frac{1}{1-g_c^2/g_o^2} \qquad (7.3 \text{ and } 7.4)$$

For values of $g_o$ and $g_c$ calculated for a commercially available tunnel diode type IN3218, $r_2/r_1$ lies between 1.0+ and 2.3. For simplicity in what follows we will assume that $r_2=r_1$. Then:

$$N_F=1+20I_or_1+\frac{(1+g_or_1)^2}{g_c^2r_1r_2}(1+20I_or_1) \qquad (6.2)$$

let $$1+g_or_1=\pm b \text{ and } r_1=\left|\frac{1}{g_o}\right|$$

then after collecting terms:

$$N_F=\left[1+20\frac{I_o}{g_o}\right]\left[1+b^2\left(\frac{g_o}{g_c}\right)^2\right] \qquad (6.4)$$

This relation shows that (1) $g_o/I_o$ must be large to reduce the noise figure, and (2) $(g_o/g_c)^2$ must be small to keep the noise figure low when $b\neq 0$.

Referring now to lines 11 and 12 of the table in FIGURE 11, it is seen that $g_o/I_o=13.0$ (and therefore $N_F=4.1$ db; for $b=0$) for two operating conditions, namely:

(1) $E_b=0.10V$ and $E_o=0.01V$
(2) $E_b=0.12V$ and $E_o=0.02V$

However, condition (1) results in $(g_o/g_c)^2=12{,}000$ and, therefore, $N_F=25$ db for $b=\pm 0.1$; while condition (2) results in $(g_o/g_c)^2=78$ and, therefore, $N_F=6.6$ db again for $b=\pm 0.1$.

(IX) STABILITY

The circuit is stable if:

$$G_2=\frac{g_o(1+g_or_1)-g_c^2r_1}{(1+g_or_1)(1+g_or_2)-g_c^2r_1r_2}>0 \qquad (3.9.2)$$

and $$G_1=\frac{g_o(1+g_or_2)-g_c^2r_2}{(1+g_or_1)(1+g_or_2)-g_c^2r_1r_2}>0 \qquad (3.7.2)$$

Inserting $1+g_or_1=0$ in 3.9.2, results in:

$$G_2=1/r_2$$

which is greater than zero.

Inserting $1+g_or_1=0$ in 3.7.2, results in:

$$G_1=\frac{-(1-r_2/r_1)/r_1-g_c^2r_2}{-g_c^2r_1r_2}>0=\frac{r_1-r_2+g_c^2r_1^2r_2}{g_c^2r_1^3r_2}>0$$

or $r_1-r_2+g_c^2r_1^2r_2>0$; from which $$g_c^2r_1^2>\left[\frac{r_2-r_1}{r_2}=1-\frac{r_1}{r_2}=1-a\right] \qquad (7.1)$$

where $$\frac{r_1}{r_2}=a;\ \text{and } a>1-g_c^2r_1^2 \qquad (7.2)$$

Since $g_c^2r_1^2$ is positive, then from (7.1)

$$a\leqq 1 \qquad (7.3)$$

Since $a$ is positive, then from (7.2)

$$g_c^2r_1^2\leqq 1 \qquad (7.4)$$

or since $$r_1=1/|g_o|\left(\frac{g_c}{g_o}\right)^2\leq 1 \qquad (7.4.1)$$

The circuit is stable for 7.3 and 7.4.1 when $1+g_or_1=0$

(X) POWER GAIN, BANDWIDTH, AND NOISE FIGURE WHEN $1+g_or_1=0$

(A) *Power Gain $G_p$*

From (4.8)

$$G_p=\frac{r_2}{r_g}\left[\frac{2g_cr_1}{(1+g_or_1)(1+g_or_2)-g_c^2r_1r_2}\right]^2$$

Insert $1+g_or_1=0$, then $g_o=-1/r_1$, and $$G_p'=4/g_c^2r_gr_2 \qquad (8.1)$$

let $r_g=r_1$, then $G_p'=4/g_c^2r_1r_2$ let $r_2=r_1/a$, then $$G_p'=4a/g_c^2r_1^2 \qquad (8.2)$$
$$=4a(g_o/g_c)^2 \qquad (8.2.1)$$

It is seen from (8.2) that a low value of $g_c$ results in a high value for the power gain $G_p'$. However, this may result in a high noise figure if $1+g_or_1$ is not exactly zero, as shown by:

$$N_F=1+20I_or_1+\frac{(1+g_or_1)^2}{g_c^2r_1r_2}(1+20I_or_2) \qquad (5.2)$$

This close adjustment required to make $1+g_or_1=0$, makes it desirable to maintain a farly high value of $g_c$ and therefore a low value of $G_p$. In addition, it may be desirable to use a low value of local oscillator swing $(E_o)$ to reduce the excursion in the value of $g_o$ about its value at $E_b$.

(B) *Bandwidth BC*

From (4.5)

$$BC=\frac{(1+g_or_1)(1+g_or_2)-g_c^2r_1r_2}{(1+g_or_2)r_1}$$

insert $1+g_or_1=0$, then $g_o=-1/r_1$, and $$BC=-\frac{g_c^2r_1r_2}{\left(1-\frac{r_2}{r_1}\right)r_1}=g_c^2r_1\frac{r_2}{r_2-r_1}$$

$$=g_c^2r_1\frac{1}{1-\frac{r_1}{r_2}} \qquad (8.3)$$

$$=\frac{g_c^2}{g_o}\frac{1}{1-\frac{r_1}{r_2}} \qquad (8.3.1)$$

(C) *Sample values*

Values of $g_o$, $g_c$, and $I_d$ were computed for tunnel diode 1N32218 for different values of $E_b$ and $E_o$. From these values, the power gain, BC product, and noise figures were calculated from Equations 8.2; 8.3; and 6.1. Some values, which result in stable operation, are shown in the table of FIGURE 11.

(XI) SUMMARY

The system noise figure of a tunnel diode converter is expressed in Equation 5.2. If the quantity $1+g_or_1$ of this equation is equal to zero, it will be seen that the noise figure will be reduced. Expressed in another manner, the noise figure is reduced because the negative resistance diode permits the gain of the system to be adjusted so that the noise originating at I–F is converted to signal frequency and back to I–F in an amplitude to equal the originating I–F noise component. Since the originating I–F noise current and the converted and reconverted component are in phase opposition, they cancel.

The quantity $g_o$ is a function of the bias voltage amplitude and the amplitude of the local oscillator voltage applied to the tunnel diode 18 as will be seen from FIGURE 10. The quantity $r_1$ includes the input circuit 12 impedance as well as that of the signal source 10.

When $1+g_or_1=0$ the noise figure of the converter is a function of the ratio of the average conductance $g_o$ to the D.-C. current through $I_o$ the diode. Increasing values of $|g_o/I_o|$ are shown in column 6 of FIGURE 11. It will be seen from column 9 of FIGURE 11 that the noise figure is minimum for the largest absolute value of $g_o/I_o$.

Column 10, of FIGURE 11 shows the noise figure when $1+g_or_1=\pm0.1$. In this case Equation 6.4 shows that the noise figure is not only a function of the ratio $|g_o/I_o|$, but also is a function of the ratio $(g_o/g_c)^2$. From column 10 it will be seen that the best noise figures occur for the operating conditions specified in lines 8 and 9 wherein the ratio $(g_o/g_c)^2$ is at a near minimum for reasonably large values of the ratio $g_o/I_o$.

In accordance with one embodiment of the invention, the bias voltage and oscillator drive are adjusted to provide the largest value for the ratio $|g_o/I_o|$ where $g_o$ is negative. $g_o$ may be made negative by biasing the diode in the negative resistance portion of its characteristic. The input resistance $r_1$, including that of the input circuit 12 and signal source 10, is then adjusted to a value where $1+g_or_1=0$.

With the particular germanium diode whose characteristics are shown in FIGURES 10 and 11, a D.-C. bias voltage of .12 volt is applied to the diode in a manner to permit stable biasing in the negative resistance region of the current-voltage characteristic. The peak oscillator voltages is .01 volt producing an average conductance of −6.8 mho. The input resistance $r_1$ including the resistance of the input circuit 12 and the signal source 10 is 1/6.8 ohms. Thus the quantity $1+g_or_1$ is equal to zero. This permits optimum noise operation of the frequency converter.

In accordance with a second embodiment of the invention, where the quantity $1+g_or_1$ cannot be maintained exactly zero because of expected circuit tolerances or the like, this quantity is maintained as small as possible, but the operating voltages may be different from those specified above to prevent degradation of the noise figure when the quantity $1+g_or_1$ does not exactly equal zero. Under these conditions, the operating voltages applied to the diode are adjusted to provide a low value for the quantity $(g_o/g_c)^2$ consistent with a reasonably high value for the quantity $|g_o/I_o|$. It will be noted from column 7 of FIGURE 11 that $(g_o/g_c)^2$ has low values for lines 1–3 and for lines 8 and 9. However the values for $|g_o/I_o|$ in lines 1–3 is very small, but is quite large for lines 8 and 9. Accordingly the operating voltages used are those specified in lines 8 and 9 with the input resistance $r_1$ adjusted to provide as low a quantity $1+g_or_1$ as possible. For the operating conditions specified in lines 8 and 9, the noise figure of the converter drops from 4.2 to 4.5 when the quantity $1+g_or_1$ changes from zero to $\pm0.1$, whereas considerably poorer noise figure results in both cases for the operating conditions specified in lines 1–3 of FIGURE 11.

It is seen from Equation 3.7.2 that the input conductance $G_1$ can be positive, zero, or negative by suitable choice of parameters. It is often desirable to make the input conductance as low as possible, and by adjusting the circuit parameters of Equation 3.7.2 the input conductance may be made as low as necessary.

What is claimed is:

1. A tunnel diode mixer circuit which is optimized for low noise operation comprising in combination, a tunnel diode, a signal input circuit for signals of a first frequency coupled to said tunnel diode, a signal output circuit for corresponding signals of a second frequency coupled to said tunnel diode, means providing a source of local oscillations coupled to said tunnel diode, means providing a source of direct current biasing voltage coupled to said tunnel diode to forward bias said diode in the negative, resistance region of its current-voltage characteristic, the amplitude of said biasing voltage and said local oscillations being such as to provide a conversion conductance $g_c$ and a negative average conductance $(-g_o)$ and a direct current through the diode $I_o$ wherein a near minimum value for the ratio $(g_o/g_c)^2$ is achieved for a near maximum value for the ratio $-g_o/I_o$.

2. A tunnel diode mixer circuit as defined in claim 1 wherein said signal input circuit has an equivalent resistance $r_1$ of a value so that the quantity $1+g_or_1$ is substantially equal to zero.

References Cited by the Examiner

UNITED STATES PATENTS 2,978,576 4/1961 Watters ............ 325—443

OTHER REFERENCES

Arguimbau: Vacuum Tube Circuits and Transistors, pp. 620–637.

Brietzer: "Noise Factor in Tunnel Diode Mixer."

Pucel: "The Esaki Tunnel Diode," Electrical Manufacturing, February 1960.

General Electric Transistor Manual, Fifth Edition, 1960, pp. 154–156.

Proceedings of the I.R.E., May 1960, pp. 935–937.

DAVID G. REDINBAUGH, *Primary Examiner.*